(No Model.)

T. J. NICHOLL.
NUT.

No. 460,266. Patented Sept. 29, 1891.

Fig. 1.

Fig. 2.

Witnesses.
Chas Gaylord
Clifford N. White

Inventor:
Tom J. Nicholl
By Dyrenforth & Dyrenforth
Attys

UNITED STATES PATENT OFFICE.

TOM J. NICHOLL, OF CHICAGO, ILLINOIS.

NUT.

SPECIFICATION forming part of Letters Patent No. 460,266, dated September 29, 1891.

Application filed September 16, 1890. Serial No. 365,146. (No model.)

*To all whom it may concern:*

Be it known that I, TOM J. NICHOLL, a citizen of the United States, residing at Chicago, in the county of Cook and State of Illinois, have invented a new and useful Improvement in Nuts, of which the following is a specification.

My invention relates to an improved construction of a nut, whereby it shall be adapted effectually to lock itself against the object to which it is applied for holding the bolt on which it is screwed.

In the accompanying drawings, Figure 1 is a perspective view of my improved nut, and Fig. 2 a section taken on the line 2 2 of Fig. 1 and viewed in the direction of the arrows.

A is a nut, which may be of any desired shape and size, but which is preferably formed of steel, though it may be formed of iron or brass or other material. At opposite sides of the threaded opening $r$ I form on the surface of the nut which in its application becomes the "inner" surface (meaning thereby that side which, in screwing the nut in place, is caused to bear against the object to be fastened by the bolt to which the nut is applied) a springy projection $q$, which should extend radially from the opening $r$ to an edge of the nut, though it may extend at a different angle and be shorter than stated. Two of these springs $q$ are shown in the drawings as extending in contrary directions at diagonally opposite sides of the threaded opening, and that number is preferred, though it may be increased, and it is even within the spirit of my invention to provide but one.

I form the spring projections $q$ (though they may be otherwise formed, but I believe not so readily) by means of a suitable die, which operates to cut diagonally into the metal surfaces $p$ at one or more sides of the opening $r$, and bend the cut portion $q$ outward to, or substantially to, the form illustrated, causing it to project beyond the surface $p$ and form a spring having a recess behind it in the bearing-surface of the nut to receive the spring as the nut is turned home. If the thread in the opening $r$ were caused to extend to the surface $p$ in forming the springs $q$, the die would cut the thread, leaving a portion thereof on the inner surface of each spring, which might interfere with the screwing of the nut on the threads of a bolt. Hence I form a plain circular recess $n$, extending from the surface $p$ to such a depth in the opening as the die is caused to penetrate, of greater diameter than the threaded portion of the opening, whereby in forming the thread the threading implement can not operate in the recess.

The nut is applied on a bolt in a position to force its surface $p$ against the object to be fastened, thereby causing the springs $q$ to be forced backward, but in resisting the pressure to indent the surface of the said object, (as the fish-plate of a railway-rail,) and thus perform the function of spring-pawls. The resilience of the springs alone tends by the resultant bearing force against the object to prevent working of the nut, and the indentation of the surface of the object by the spring further increases the hold or locking effect.

What I claim as new, and desire to secure by Letters Patent, is—

1. A locking-nut provided on its bearing-surface with a spring indenting-pawl integral with the nut and with a recess behind the pawl to receive the same as the nut is turned home, substantially as described.

2. A locking-nut having a recess $n$ at the inner end of its threaded opening $r$ and provided on its bearing-surface with spring indenting-pawls $q$ integral with the nut and with recesses behind the pawls to receive them as the nut is turned home, substantially as described.

TOM J. NICHOLL.

In presence of—
CHAS. E. GAYLORD,
M. J. FROST.